UNITED STATES PATENT OFFICE.

RUDOLF TAMBACH, OF LUDWIGSHAFEN-ON-THE-RHINE, GERMANY, ASSIGNOR TO THE FIRM OF KNOLL AND COMPANY, OF LUDWIGSHAFEN-ON-THE-RHINE, GERMANY.

CASEIN DERIVATIVES AND PROCESS FOR THE MANUFACTURE OF THE SAME.

1,037,685.   Specification of Letters Patent.   Patented Sept. 3, 1912.

No Drawing.   Application filed March 20, 1908. Serial No. 422,241.

*To all whom it may concern:*

Be it known that I, RUDOLF TAMBACH, a subject of the German Emperor, residing at Ludwigshafen-on-the-Rhine, Germany, have invented certain new and useful Casein Derivatives and Processes for the Manufacture of the Same, of which the following is a specification.

Chlorinated derivatives of casein have hitherto been prepared by treating casein dissolved in the necessary quantity of sodium carbonate solution with chlorin, care being taken, that the hydrochloric acid formed during the reaction is neutralized with solid sodium carbonate, after the solution has become acid. This process is repeated, until a sample of the product shows a sufficiently high percentage of chlorin.

According to another known method (Habermann and Ehrenfeld *Zeitschrift für Physiologische Chemie*, vol. 32 (1901) pages 470 and 471) casein in alkaline solution has been mixed with potassium chlorate, and this solution treated with gaseous hydrochloric acid, until the cake separated out at the beginning of the acid reaction and consequently of the liberation of chlorin has again entered into solution. From the acid liquid thus obtained the casein chlorid derivative is then separated by means of water. The process therefore consists in treating casein with nascent chlorin in the presence of acids.

I have found, that when casein in alkaline solution is treated with alkali-hypochlorites or with chlorin in the cold or with the aid of heat, simultaneous oxidation and chlorination of the casein takes place, provided that the action of the chlorinating media takes place in the presence of an excess of alkali, or is interrupted at the commencement of the acid reaction. The products obtainable in this manner differ essentially as regards their physical properties from those obtained by the processes hitherto known.

The chlorinated derivatives of casein obtained by treating with chlorin a solution of casein, for instance in a solution of sodium-carbonate, while taking care that an excess of sodium carbonate is present or by interrupting the treatment with chlorin at the commencement of the acid reaction, are soluble in alkalis, but insoluble in water, acids and alcohol of various degrees of strength. The products prepared by Habermann and Ehrenfeld's method and also those prepared according to the present process are soluble in alkalis, and insoluble in water and acids; the absence of sulfur is a feature common to both, and both are soluble in dilute alcohol with the aid of heat, but while the product of Habermann and Ehrenfeld remains in solution, after the addition of concentrated alcohol, the product obtained by the present process is precipitated. Moreover, the present process utilizes about 70 per cent. of the casein employed, while according to Habermann and Ehrenfeld only about 5 per cent. of the casein employed is converted into the chlorin derivative, if in the process of chlorination the introduction of hydrochloric acid is continued until the real solution of the casein.

The chlorinated and oxidized derivatives of casein are obtained by the present process in the shape of a yellow powder, in which the percentage of chlorin varies between 2 and 8 per cent., according to the conditions of working. They are free from sulfur, contain phosphorus and about 12 per cent. of nitrogen.

Example I: 1 kilogram of casein is stirred together with 10 liters of water and dissolved in 2 liters of a 20 per cent. caustic soda solution, the solution is then heated with 2 liters of an approximately ten per cent. sodium hypochlorite solution at 75–80° C. for about 2 hours. After the small quantity of residue has been separated by filtration, the filtrate is treated with strong hydrochloric acid, to precipitate the chlorinated derivatives of casein. The product, when dried, contains about 5 per cent. of chlorin, which cannot be separated by boiling with a solution of potassium iodid.

Example II: A hot solution (about 70° C.) of 1 kilogram of casein in 5 liters of water and 2 liters of a 35% caustic soda solution is treated with gaseous chlorin, until the formation of a precipitate commences. Complete precipitation is produced by means of mineral acids, and the chlorinated derivative of casein thus produced is filtered off and washed with absolute alcohol and ether. When dried, it contains about 3.5 per cent. of chlorin.

Example III: A warm solution (about

30° C.) of 1 kilogram of casein in 10 liters of water and 2 liters of a 20 per cent. caustic soda solution is treated with chlorin gas, until the generation of gas which occurs at first subsides. During the whole time the liquid, in which the chemical reaction takes place, must be kept alkaline. The casein chlorin derivative produced is then separated by means of acid, washed with absolute alcohol and dried. When dried, it contains about 8 per cent. of chlorin, which may be split off partly by means of potassium-iodid solution.

Example IV: 1 kilogram of casein is dissolved in 10 liters of water and 1 liter of a 25% sodium carbonate solution at the temperature of a water-bath and then treated with chlorin gas at about 30° C. until the solution begins to become acid (as shown by a test sample). The chlorinated derivatives of casein produced are then separated by means of mineral acids, which product after filtration is washed with absolute alcohol and ether and dried. When dried it contains about 4 per cent. of chlorin.

I have found that these chlorinated derivatives of casein possess strong antiseptic or anti-putrescent properties. These properties render them suitable for use as antiseptics.

What I claim is:—

The herein described process for the manufacture of chlorinated derivatives of casein, which consists in causing chlorin to act upon casein dissolved in a solution of alkali, in the presence of an excess of alkali, and precipitating the chlorinated oxidation products thus obtained by treating the reaction liquid with an acid.

In testimony whereof I have hereunto set my hand in presence of two subscribing witnesses.

RUDOLF TAMBACH.

Witnesses:
 OSWALD KRUG,
 JOS. H. LEUTE.